United States Patent
Pannell

(10) Patent No.: US 9,584,342 B1
(45) Date of Patent: Feb. 28, 2017

(54) ENHANCED AUDIO VIDEO BRIDGING (AVB) METHODS AND APPARATUS

(75) Inventor: Donald Pannell, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 102 days.

(21) Appl. No.: 13/115,868

(22) Filed: May 25, 2011

Related U.S. Application Data

(60) Provisional application No. 61/348,693, filed on May 26, 2010.

(51) Int. Cl.
   *H04L 12/46* (2006.01)
   *H04L 12/54* (2013.01)
   *H04L 12/913* (2013.01)

(52) U.S. Cl.
   CPC ........ *H04L 12/5695* (2013.01); *H04L 12/462* (2013.01); *H04L 47/724* (2013.01)

(58) Field of Classification Search
   CPC .. H04L 12/5695; H04L 47/724; H04L 12/462
   See application file for complete search history.

(56) References Cited

U.S. PATENT DOCUMENTS

| | | | |
|---|---|---|---|
| 5,953,019 A * | 9/1999 | Shimakawa et al. | 345/535 |
| 6,052,683 A * | 4/2000 | Irwin | 707/758 |
| 6,377,782 B1 * | 4/2002 | Bishop et al. | 455/3.01 |
| 6,510,138 B1 | 1/2003 | Pannell | |
| 6,816,489 B1 | 11/2004 | Patra et al. | |
| 6,819,653 B1 | 11/2004 | Hodgins et al. | |
| 6,987,770 B1 * | 1/2006 | Yonge, III | 370/401 |
| 7,035,273 B1 | 4/2006 | Pannell et al. | |
| 7,110,415 B1 | 9/2006 | Walsh et al. | |
| 7,209,440 B1 | 4/2007 | Walsh et al. | |

(Continued)

OTHER PUBLICATIONS

IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Sections 1-5, Dec. 9, 2005.

(Continued)

*Primary Examiner* — Walter Divito

(57) ABSTRACT

A packet is received via a port of the network device, and a database lookup is performed using header information of the packet. A priority associated with the packet is determined, and it is determined whether the priority is associated with a particular communication protocol that provides guaranteed delivery, defined latency, and/or defined throughput. When it is determined that the priority is associated with the particular communication protocol, i) it is determined, based on the database lookup, whether a destination address (DA) of the packet is associated with the particular communication protocol, and ii) when it is determined that the DA of the packet is associated with the particular communication protocol, the packet is prevented from egressing from ports of the network device that are operating according to the particular communication protocol with a frame priority indicator corresponding to a value reserved for the particular communication protocol.

12 Claims, 10 Drawing Sheets

(56) References Cited

U.S. PATENT DOCUMENTS

| | | | |
|---|---|---|---|
| 7,457,297 | B2 | 11/2008 | Woo et al. |
| 2002/0087723 | A1* | 7/2002 | Williams et al. ............ 709/240 |
| 2005/0027837 | A1* | 2/2005 | Roese et al. ................. 709/223 |
| 2005/0054370 | A1* | 3/2005 | Shpak .......................... 455/525 |
| 2005/0220105 | A1 | 10/2005 | Yen et al. |
| 2005/0281235 | A1 | 12/2005 | Beach et al. |
| 2007/0153802 | A1* | 7/2007 | Anke et al. ............. 370/395.42 |
| 2008/0037567 | A1 | 2/2008 | Cho et al. |
| 2008/0112433 | A1 | 5/2008 | Feng et al. |
| 2008/0114887 | A1 | 5/2008 | Bryers et al. |
| 2008/0123531 | A1* | 5/2008 | Gerkis ......................... 370/235 |
| 2008/0212591 | A1 | 9/2008 | Wu et al. |
| 2008/0285574 | A1 | 11/2008 | Teener |
| 2008/0288638 | A1* | 11/2008 | Diab et al. ................... 709/225 |
| 2009/0016217 | A1* | 1/2009 | Kashyap ...................... 370/231 |
| 2009/0031044 | A1 | 1/2009 | Barrack et al. |
| 2009/0049175 | A1* | 2/2009 | Finn ............................. 709/226 |
| 2009/0160943 | A1 | 6/2009 | Badt, Jr. et al. |
| 2009/0180389 | A1 | 7/2009 | Mack-Crane et al. |
| 2009/0201844 | A1 | 8/2009 | Bhatti et al. |
| 2010/0122098 | A1 | 5/2010 | Kay |
| 2010/0220724 | A1* | 9/2010 | Rabie et al. ................. 370/392 |
| 2010/0238836 | A1 | 9/2010 | Diab et al. |
| 2011/0044226 | A1 | 2/2011 | Song et al. |

OTHER PUBLICATIONS

IEEE Std 802.1Q, 2003 Edition, "IEEE Standards for Local and Metropolitan area networks—Virtual Bridged Local Area Networks," *The Institute of Electrical and Electronics Engineers, Inc.*, May 7, 2003.

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, Aug. 17, 2005, 60 pages.

IEEE Std 802.11e/D11.0, "IEEE Standard for Information technology—Telecommunications and information exchange between systems—Local and metropolitan area networks—Specific requirements, Part 11: Wireless Medium Access Control (MAC) and Physical Layer (PHY) Specifications: Amendment 7: Medium Access Control (MAC) Quality of Service (QoS) Enhancements," *The Institute of Electrical and Electronics Engineers, Inc.*, Oct. 2004.

Office Action in U.S. Appl. No. 13/115,865 dated Feb. 15, 2013 (21 pages).

Office Action in U.S. Appl. No. 13/115,865 dated Jul. 23, 2013 (24 pages).

Office Action in U.S. Appl. No. 13/115,865 dated Feb. 4, 2014 (25 pages).

Office Action in U.S. Appl. No. 13/115,865 dated Jun. 30, 2014 (24 pages).

Office Action in U.S. Appl. No. 13/115,865 dated May 12, 2014 (15 pages).

Office Action in U.S. Appl. No. 13/115,682 dated Feb. 13, 2013 (21 pages).

Office Action in U.S. Appl. No. 13/115,682 dated Aug. 21, 2013 (24 pages).

Office Action in U.S. Appl. No. 13/115,682 dated Jan. 15, 2014 (24 pages).

Office Action in U.S. Appl. No. 13/115,682 dated Jun. 18, 2014 (23 pages).

Office Action in U.S. Appl. No. 13/115,682 dated Apr. 8, 2015 (16 pages).

Office Action in U.S. Appl. No. 13/115,670 dated Feb. 26, 2013 (17 pages).

Office Action in U.S. Appl. No. 13/115,670 dated Jul. 10, 2013 (20 pages).

Office Action in U.S. Appl. No. 13/115,670 dated Mar. 21, 2014 (24 pages).

Office Action in U.S. Appl. No. 13/115,670 dated Jul. 25, 2014 (24 pages).

Office Action in U.S. Appl. No. 13/115,670 dated May 4, 2015 (20 pages).

U.S. Appl. No. 13/115,670, Pannell et al., "Methods and Apparatus for Handling Multicast Packets in an Audio Video Bridging (AVB) Network," filed May 25, 2011.

U.S. Appl. No. 13/115,682, Pannell et al., "Methods and Apparatus for Handling Management Packets in an Audio Video Bridging (AVB) Network," filed May 25, 2011.

U.S. Appl. No. 13/115,865, Pannell et al., "Enhanced Audio Video Bridging (AVB) Methods and Apparatus," filed May 25, 2011.

IEEE P802.1AS/D0.8, "Draft Standard for Local and Metropolitan Area Networks—Timing and Synchronization for Time-Sensitive Applications in Bridged Local Area Networks," The Institute of Electrical and Electronics Engineers, Inc., pp. 1-149 (May 25, 2007).

Abstract of IEEE 802.1AS Standard, "802.1AS—Timing and Synchronization," *The Institute of Electrical and Electronics Engineers, Inc.*, available at http://www.ieee802.org/1/pages/802.1as.html, 1 page (Mar. 30, 2011).

* cited by examiner

554 — USE HEADER INFORMATION TO RETRIEVE FROM DATABASE INFORMATION INDICATING WHETHER PACKET SHOULD BE ENQUEUED AS IF AN AVB PACKET AND INFORMATION INDICATING WHETHER PRIORITY INDICATOR FIELD IN HEADER CAN BE MODIFIED

558 — TREAT AS AVB? — NO → END

YES ↓

562 — OK TO MODIFY PRI? — NO → END

YES ↓

566 — SET VARIABLE TO INFORM QUEUE CONTROLLER THAT PACKET IS TO BE ENQUEUED AS IF AN AVB PACKET

570 — MODIFY PRIORITY INDICATOR FIELD IN HEADER ACCORDING TO VALUE FROM DATABASE

END ively using existing IEEE 802.1Q forwarding and priority mechanisms but also defines a particular relation-# ENHANCED AUDIO VIDEO BRIDGING (AVB) METHODS AND APPARATUS

CROSS-REFERENCES TO RELATED APPLICATIONS

This disclosure claims the benefit of U.S. Provisional Patent Application No. 61/348,693, entitled "AUDIO VIDEO BRIDGING POLICY ENHANCEMENTS," filed on May 26, 2010, which is hereby incorporated by reference herein in its entirety.

This disclosure is related to the following U.S. Patent Applications filed on the same day as the present application:

U.S. patent application Ser. No. 13/115,670 entitled "METHODS AND APPARATUS FOR HANDLING MULTICAST PACKETS IN AN AUDIO VIDEO BRIDGING (AVB) NETWORK";

U.S. patent application Ser. No. 13/115,865 entitled "ENHANCED AUDIO VIDEO BRIDGING (AVB) METHODS AND APPARATUS";

U.S. patent application Ser. No. 13/115,682 entitled "METHODS AND APPARATUS FOR HANDLING MANAGEMENT PACKETS IN AN AUDIO VIDEO BRIDGING (AVB) NETWORK".

All of the above U.S. Patent Applications are hereby incorporated by reference herein in their entireties.

FIELD OF THE DISCLOSURE

The present disclosure relates generally to communication networks and, more particularly, to switch devices for handling low-latency streams.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Audio Video Bridging (AVB), is a set of standards developed and being developed by the Institute for Electrical and Electronics Engineers (IEEE) 802.1 working group with the intent of supporting real-time traffic, such as audio traffic and video traffic, with defined latencies and throughput, and guaranteed delivery.

This is a change in direction as compared to past communication network protocols, such as the IEEE 802.3 Ethernet standard and the IEEE 802.11 wireless local area network (WLAN) standards, that are designed to be 'best effort' protocols. 'Best effort' here means that there are no guarantees of delivery nor is the latency through the network reasonably definable. These older Ethernet and WLAN networks are allowed to drop (or discard) data at Layer 1 and/or Layer 2, and it is the responsibility of higher layer protocols in the protocol stack to insure reliable delivery of data by the re-transmission of the dropped portions. Such re-transmissions insure users get the full content of their e-mails and other file transfers, but the re-transmissions do not help when the data is time sensitive such as audio and/or video streams. Re-transmission cannot be done in these cases as the window of usage of the information has usually past (i.e., the re-transmitted data typically shows up too late to help).

A phone conversation is an example application that uses real-time audio. The quality of a phone connection is typically excellent when making a POTS (Plain Old Telephone System) call. However, the same call using via the Internet is generally not as good and may not be acceptable at the present day. This is because a POTS network guarantees enough bandwidth for each call with defined latencies. The Internet currently cannot provide such guarantees.

A goal of AVB is to support real-time data streams with defined latencies and guaranteed delivery, over Ethernet- and WLAN-type networks, while at the same time allowing the previous (and future) applications to continue functioning on these same networks.

Devices configured to operate according to AVB (AVB devices) periodically exchange timing information that allows both ends of a link to synchronize their time base reference clock very precisely. This precise synchronization allows synchronization of multiple streams and provides a common time base for sampling/receiving data streams at a source device and presenting those streams at the destination device with the same relative timing.

AVB utilizes stream reservations to help insure that an AVB stream can start (or be joined to) only if all the bridges in the path of the stream have sufficient resources to support the stream. Resources include available buffers and bandwidth of the links. Additionally, AVB reservations help insure that no more than 75% of a link's bandwidth (as a default) is used for AVB streams. This helps insure the applications of the network can continue to function as before.

AVB also utilizes stream shaping to define how AVB data should be transmitted in the absence of congestion. Traffic shaping is a process of smoothing out the traffic for a stream so that the packets making up the stream are evenly distributed in time. If traffic shaping is not done at sources and bridges, then packets of a stream tend to "bunch" into bursts of traffic that can overwhelm buffers in subsequent bridges, switches and other infrastructure devices. AVB implements traffic shaping using existing IEEE 802.1Q forwarding and priority mechanisms but also defines a particular relationship between priority tags and frame forwarding behavior at endpoints and bridges.

SUMMARY

In one embodiment, a method implemented in a network device includes receiving a packet via a port of the network device, and performing a database lookup using header information of the packet. The method also includes determining a priority associated with the packet, and determining whether the priority is associated with a particular communication protocol that provides guaranteed delivery, defined latency, and/or defined throughput. Additionally, the method includes, when it is determined that the priority is associated with the particular communication protocol, i) determining, based on the database lookup, whether a destination address (DA) of the packet is associated with the particular communication protocol, and ii) when it is determined that the DA of the packet is associated with the particular communication protocol, preventing the packet from egressing from ports of the network device that are operating according to the particular communication protocol with a frame priority indicator corresponding to a value reserved for the particular communication protocol.

In another embodiment, a network device comprises a plurality of ports, and a database. The network device is configured to receive a packet via one of the ports, and perform a lookup in the database using header information of the packet. Additionally, the network device is configured to determine a priority associated with the packet, and determine whether the priority is associated with a particular communication protocol that provides guaranteed delivery, defined latency, and/or defined throughput. Also, the network device is configured, when it is determined that the priority is associated with the particular communication protocol, i) to determine, based on the database lookup, whether a destination address (DA) of the packet is associated with the particular communication protocol, and ii) when it is determined that the DA of the packet is associated with the particular communication protocol, to prevent the packet from egressing from ports that are operating according to the particular communication protocol with a frame priority indicator corresponding to a value reserved for the particular communication protocol.

BRIEF DESCRIPTION OF THE DRAWINGS

FIG. 8 is a flow diagram of another example method for processing non-AVB packets in a network device to enqueue the non-AVB packets as if AVB packets, according to another embodiment.

DETAILED DESCRIPTION

In embodiments described below, a network device such as a Layer-2 and/or Layer 3 switch/router/bridge device (referred to herein as a "switch" for convenience) is configured to operate according to the Audio Video Bridging (AVB) protocol being developed by the IEEE 802.1 working group. In various embodiments, the switch is configured to provide one or more enhancements that enable improved performance of the switch and/or network. Some of the enhancements enable improved performance when the switch operates in a network having non-AVB devices, i.e., devices that are not configured to operate according to the AVB protocol.

Figure 1:
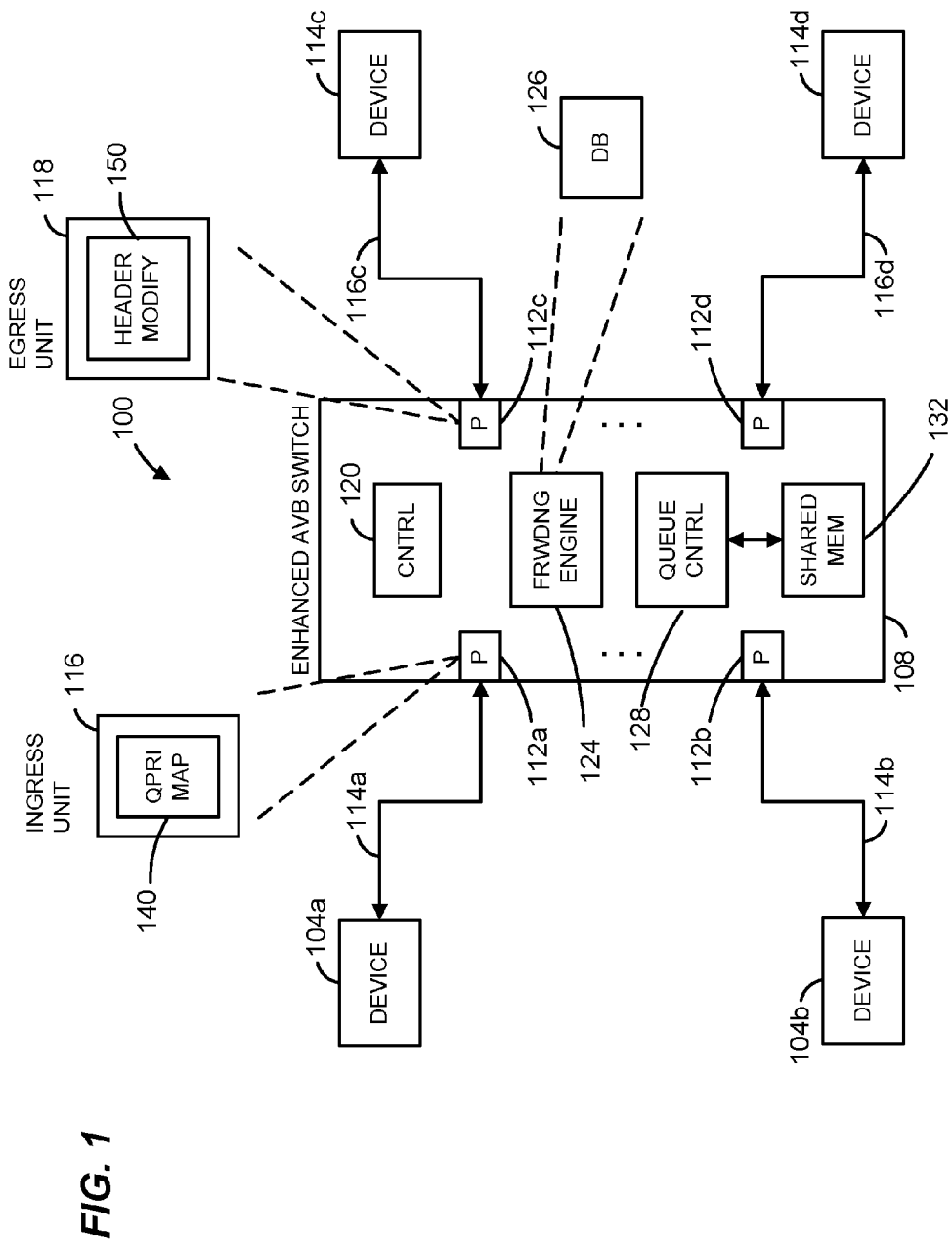
FIG. 1 is a block diagram of an example network 100 according to an embodiment.

FIG. 1 is a block diagram of an example network 100 according to an embodiment. The network 100 includes a plurality of devices 104 communicatively coupled to a switch 108. The switch 108 (referred to herein as an "enhanced AVB switch") is configured to operate according to the AVB protocol and configured to provide one or more enhancements that enable improved performance of the switch 108 and/or network 100, in some embodiments.

The enhanced AVB switch 108 includes a plurality of ports 112. The plurality of devices 104 are communicatively coupled to the enhanced AVB switch 108 via the ports 112. For example, the device 104a is communicatively coupled to the port 112a; the device 104b is communicatively coupled to the port 112b, and so on. Although the enhanced AVB switch 108 is depicted in FIG. 1 as having at least four ports 112, the enhanced AVB switch 108 includes a different suitable number of ports in other embodiments. Although the network 100 is depicted in FIG. 1 as having four devices 104, the network 100 includes a different suitable number of devices 104 in other embodiments. Each device 104 is a suitable electronic device that sources data, is a destination of data sourced by another device 104, or forwards data. For example, the devices 104 may include one or more of desktop computers, laptop computers, smart phones, audio/visual equipment, network attached storage devices, printers, network switches, etc. Each device 104 is configured to transmit and receive packets via a respective communication link 114. Similarly, each port 112 is configured to transmit and received packets via the respective communication link 114.

In some embodiments and/or scenarios, a first set of one or more of the devices 104 are configured to operate according to the AVB protocol (referred to herein as "AVB devices"), whereas a second set of one or more of the devices 104 are not configured to operate according to the AVB protocol (referred to herein as "non-AVB devices"). In some embodiments, if an AVB device 104 is coupled to a port 112, the port 112 is configured to operate generally according to the AVB protocol (referred to sometimes herein as an "AVB port"). On the other hand, if a non-AVB device 104 is coupled to a port 112, the port 112 is not configured to operate according to the AVB protocol (referred to sometimes herein as a "non-AVB port"). In some embodiments, each port 112 is configured to determine whether the port 112 is coupled to an AVB device or a non-AVB device such as by communicating with the device 104 coupled to the port 112.

In an embodiment, each port 112 includes an ingress processing unit 116. The ingress processing unit 116 generally processes packets that ingress via the port 112. Similarly, in an embodiment, each port includes an egress processing unit 118. The egress processing unit 118 generally processes packets that egress via the port 112.

In an embodiment, the enhanced AVB switch 108 includes a controller 120 that configures the ports 112 to either operate generally according to the AVB protocol or not according to the AVB protocol. In an embodiment, the controller 120 includes a processor that executes machine readable instructions stored in a memory of, or coupled to, the controller 120 (not shown). The controller 120 is coupled to the ports 112. In an embodiment, the controller 120 is configured to determine whether a port 112 is coupled to an AVB device or a non-AVB device such as by communicating with the device 104 coupled to the port 112.

The enhanced AVB switch 108 also includes a forwarding engine 124 coupled to the ports 112 (coupling not shown in FIG. 1 for clarity). The forwarding engine 124 is configured to determine via which port or ports 112 a packet, which was received via one of the ports 112, should be transmitted. In some embodiments, the forwarding engine 124 analyzes data in a header of the packet to determine via which port or ports 112 the packet should be transmitted. For example, the forwarding engine 124 analyzes one or more of a destination address (unicast, multicast, or broadcast), a virtual local area network (VLAN) tag, etc., in the packet. The forwarding engine 124 includes a forwarding database 126 that stores forwarding information for different destination addresses (e.g., media access control (MAC) addresses, Internet Protocol (IP) addresses, VLANs, multicast addresses, etc.). In an embodiment, the forwarding engine 124 includes an address translation unit (ATU).

In an embodiment, the ingress units 116 of the ports 112 are coupled to the forwarding engine 124. For a port 112 via which a packet ingressed (an ingress port 112), the ingress port 112 utilizes forwarding information regarding the packet from the forwarding engine 124 to determine the port or ports 112 via which the packet is to be egressed (egress port(s) 112).

The enhanced AVB switch 108 also includes a queue controller 128 coupled to a shared memory 132. The queue controller 128 and the shared memory 128 are also coupled to the ports 112 (coupling not shown in FIG. 1 for clarity). When a packet is received via an ingress port 112, the ingress processing unit 116 of the ingress port 112 requests and receives one or more pointers from the queue controller 128. The ingress processing unit 116 then stores the packet at one or more buffers in the shared memory 132 that are indicated by the received pointers.

The ingress processing unit 116 interfaces with the forwarding engine 124 to determine the appropriate one or more ports 112 for egress (egress port(s)). The ingress processing unit 116 then sends the selected pointers and indications of the one or more egress ports(s) to the queue controller 128. The queue controller 128 then sends the pointers to the appropriate one or more egress port(s) 112. These egress port(s) 112 then retrieve the packet from the buffers indicated by the pointers and transmit the packet via respective links 116. These egress port(s) 112 then release the pointers for use by another incoming packet.

As will be described in more detail below, the ingress processing unit 116 includes a queue priority mapper 140 that generally determines a queue priority indicator that indicates an egress queue into which a packet should be placed, where different egress queues correspond to different priorities. Also as will be described in more detail below, the egress processing unit 118 includes a header modifier unit 150 that modifies a header of a packet before the packet is transmitted by the port 112 via the link 114.

Figure 2:
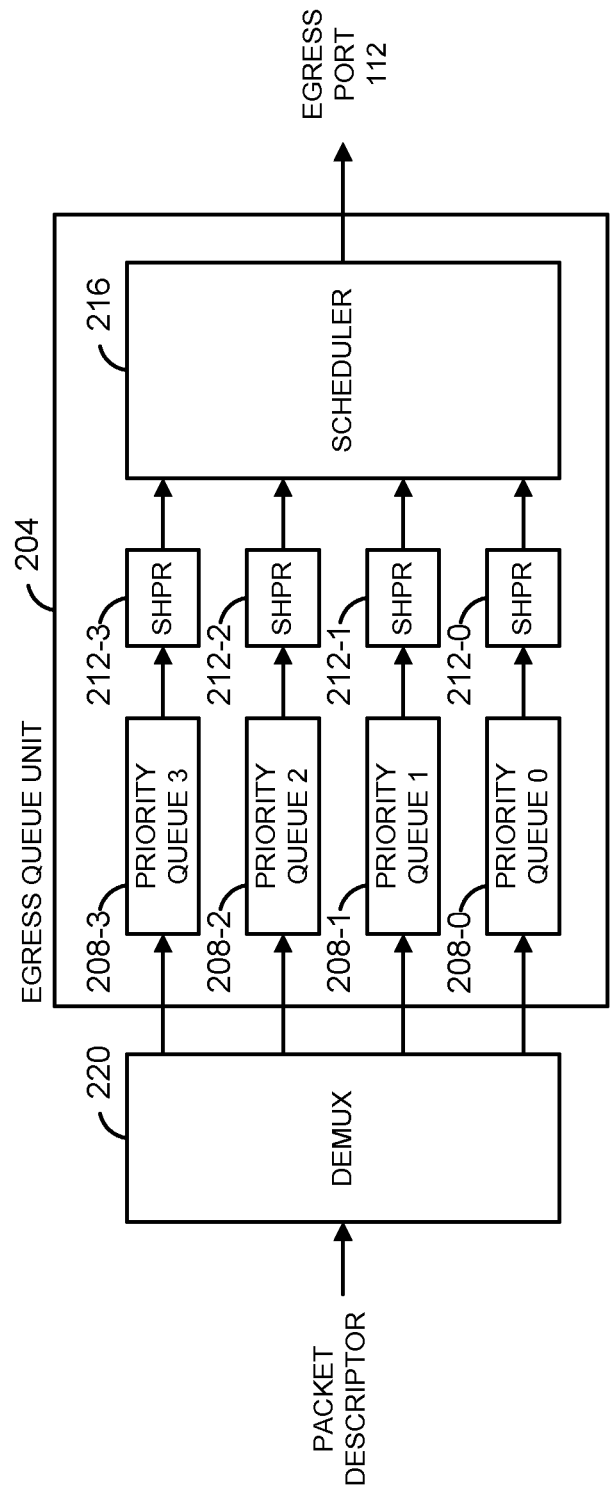
FIG. 2 is a block diagram of an example portion of a queue controller of FIG. 1, according to an embodiment.

FIG. 2 is a block diagram of an example portion 200 of the queue controller 128 of FIG. 1, according to an embodiment, and FIG. 2 will be described with reference to FIG. 1. The queue controller 128 includes a portion 200 for each port 112. The portion 200 includes an egress queue unit 204 coupled to the associated port 112. The egress queue unit 204 handles enqueuing packets for egress via the associated port 112.

More specifically, the egress queue unit 204 enqueues packet descriptors corresponding to packets and received from the forwarding engine 124. Each packet descriptor includes a pointer to a packet stored in one or more buffers in the shared memory 132. In some embodiments, the descriptor includes other information regarding the packet. For example, the descriptor includes a frame priority indicator associated with the packet, in an embodiment. The frame priority indicator indicates a priority assigned to the packet for transmission in the network and/or handling by the enhanced AVB switch, in an embodiment. The frame priority indicator is determined based on one or more of an IEEE 802.1p priority code point (PCP) field of an IEEE 802.1Q Standard VLAN tag in a header of the packet, a Differentiated Services Code Point (DSCP) field in an Internet Protocol (IP) header of the packet, an IP precedence field in the IP header, the port via which the packet was received, etc., in some embodiments. In another embodiment, the descriptor does not include the frame priority indicator.

The egress queue unit 204 includes a plurality of priority queues 208 corresponding to different priorities. In the example of FIG. 2, the egress queue unit 204 includes four priority queues 208 with priorities 3, 2, 1 and 0, where priority 3 is a highest priority and priority 0 is a lowest priority, in an embodiment. In other embodiments, another suitable number of priority queues 208 is utilized. Each queue 208 stores descriptors of packets to be transmitted from the egress port 112.

The egress queue unit 204 also includes a plurality of shaper units 212 coupled to the plurality of priority queues 208. In the example of FIG. 2, the egress queue unit 204 includes four shaper units 212 corresponding to the four priority queues 208, in an embodiment. In other embodiments, another suitable number of shaper units 212 is utilized. For example, in one embodiment, the shapers 212-0 and 212-1 are omitted. Each shaper unit 212 is configured to smooth out the traffic from the corresponding priority queue 208 so that the packets in the priority queue 208 making up a stream are evenly distributed in time.

A scheduler 216 is coupled to the egress port 112 and the priority queues 208 (via shaper units 212 in some embodiments). The scheduler 216 is configured to pass descriptors from the priority queues 208 to the egress port 112 in a manner such that precedence according to priority is given. In an embodiment, the scheduler 216 implements a strict priority queuing scheme. In other embodiments, other suitable weighting schemes are used, such as weighted fair priority queuing. According to weighted fair queuing, frames are processed so that over time, higher-priority frames are transmitted more often than lower-priority frames according to a predetermined weighting scheme and sequence. One example weighting scheme for four priorities is "8-4-2-1", in an embodiment. According to 8-4-2-1 weighting, in 15 consecutive time units, eight time units are allocated to priority 3, four time units are allocated to priority 2, two time units are allocated to priority 1, and one time unit is allocated to priority 0.

A demultiplexer unit 220 receives packet descriptors from the forwarding engine 124 and determines in which one of the priority queues 208 each packet descriptor should be placed. In an embodiment, the demultiplexer unit 220 analyzes a frame priority indictor of a packet and determines the appropriate priority queue 208 based on a priority indicator of the packet. For example, according to the AVB protocol, packets having an IEEE 802.1Q PCP field with a value 3 (as a default) should be placed in the priority queue 208-3; packets having an IEEE 802.1Q PCP field with a value 2 (as a default) should be placed in the priority queue 208-2; and, packets having an IEEE 802.1Q PCP field with a value other than 2 or 3 (as a default) should be placed in a priority queue with a lower priority than the priority queue 208-2 or the priority queue 208-3, e.g., in the priority queue 208-1 or the priority queue 208-0. The demultiplexer unit 220 then places the packet descriptor in the determined priority queue 208.

According to the AVB protocol, a switch device can be configured so that packets having an IEEE 802.1Q PCP field with a value different than 3 are to be placed in the priority queue 208-3; and packets having an IEEE 802.1Q PCP field with a value different than 2 are to be placed in the priority queue 208-2.

In an embodiment, the demultiplexer unit 220 determines the appropriate priority queue 208 further based on whether the egress port 112 is coupled to an AVB device. For example, for a particular frame priority indicator, the demultiplexer unit 220 determines a first priority queue 208 when the egress port 112 is coupled to an AVB device and determines a second priority queue 208, different than the first priority queue 208 at least in some scenarios, when the egress port 112 is coupled to a non-AVB device, in an embodiment. As a specific example, for a frame priority indicator that corresponds to a IEEE 802.1Q PCP field with a value of three (as an example), the demultiplexer unit 220 determines the priority queue 208-3 when the egress port 112 is coupled to an AVB device and determines a priority queue 208 other than the priority queue 208-3, at least in some scenarios, when the egress port 112 is coupled to a non-AVB device, in an embodiment. As another specific example, for a frame priority indicator that corresponds to a IEEE 802.1Q PCP field with a value of two (as an example), the demultiplexer unit 220 determines the priority queue 208-2 when the egress port 112 is coupled to an AVB device 104 and determines a priority queue 208 other than the priority queue 208-2, at least in some scenarios, when the egress port 112 is coupled to a non-AVB device 104, in an embodiment.

In an embodiment, the portion 200 of the queue controller 128 corresponds to a particular port 112, and is configurable to operate in a first mode when the port 112 is communicatively coupled to a device that operates according to the AVB protocol. For example, when in the first mode, the portion 200 operates so that the queue 208-3 is treated as a Class A queue according to the AVB protocol, and the queue 208-2 is treated as a Class B queue according to the AVB protocol, in an embodiment. For instance, when in the first mode, the demultiplexer unit 220 places packets with a frame priority of value 3 (as an example) into the queue 208-3, places packets with a frame priority of value 2 (as an example) into the queue 208-2, and places packets with a frame priority of value other 2 or 3 (as an example) into the queue 208-1 or the queue 208-0, in an embodiment. In an embodiment, when in the first mode, the portion 200 operates so that packets enqueued in the queue 208-3 and the queue 208-2 are handled according to guaranteed delivery, a defined throughput, and/or a defined latency. On the other hand, when in the first mode, the portion 200 operates so that packets enqueued in the queue 208-1 and the queue 208-0, are handled with best effort delivery, in an embodiment. In an embodiment, the demultiplexer unit 220 is configurable so that the demultiplexer unit 220, in the first mode, places packets with an IEEE 802.1Q PCP field with a value different than 3 in the priority queue 208-3, and places packets having an IEEE 802.1Q PCP field with a value different than 2 in the priority queue 208-2.

In an embodiment, the portion 200 is also configurable to operate in a second mode when the port 112 associated with the portion 200 is communicatively coupled to a device that is not operating according to the AVB protocol. For example, when in the second mode, the demultiplexer unit 220 is not limited to placing packets with a frame priority of value 3 (as an example) into the queue 208-3, placing packets with a frame priority of value 2 (as an example) into the queue 208-2, and placing packets with a frame priority of value other 2 or 3 (as an example) into the queue 208-1 or the queue 208-0, in an embodiment. In an embodiment, when in the second mode, the portion 200 operates so that packets enqueued in the queues 208 are handled with best effort delivery.

Referring now to FIGS. 1 and 2, in an embodiment, each port 112 includes the queue priority mapper 140 as discussed above. The queue priority mapper 140, in an embodiment, determines a first queue priority indicator and a second queue priority indicator based on a frame priority indicator associated with the packet, such as corresponding to an IEEE 802.1p PCP field in an IEEE 802.1Q VLAN tag. In an embodiment, the queue priority mapper 140 determines the first queue priority indicator and the second queue priority indicator when the packet is received via an ingress port 112. Each of the first queue priority indicator and the second queue priority indicator is an indicator of the particular priority queue 208 in which the packet descriptor corresponding to the packet should be placed when the packet descriptor is passed to the queue controller 128 and is received by the demultiplexer unit 220 for transfer to the egress port 112. In an embodiment, the first queue priority indicator indicates the particular priority queue 208 in which the packet descriptor corresponding to the packet should be placed when the egress port 112 is coupled to an AVB device 104; and, the second queue priority indicator indicates the particular priority queue 208 in which the packet descriptor corresponding to the packet should be placed when the egress port 112 is coupled to a non-AVB device 104. The first queue priority indicator and the second queue priority indicator are associated with the packet and the descriptor of the packet. In an embodiment, first queue priority indicator and the second queue priority indicator are included in the descriptor. In some embodiments, first queue priority indicator and the second queue priority indicator are appended to, or otherwise associated with, the packet in the shared memory 132.

In an embodiment, when the packet descriptor corresponding to the packet is passed to the queue controller 128 and is received by the demultiplexer unit 220 for transfer to the egress port 112, the demultiplexer unit 220 determines the appropriate priority queue 208 based on the first queue priority indicator and the second queue priority indicator and whether the egress port 112 is coupled to an AVB device. For example, the demultiplexer unit 220 determines a first priority queue 208 based on the first queue priority indicator when the egress port 112 is coupled to an AVB device, and determines a second priority queue 208 based on the second queue priority indicator when the egress port 112 is coupled to a non-AVB device.

In some embodiments, each demultiplexer unit 220 includes a queue priority mapper 150 and the queue priority mappers 150 are omitted from the ports 112. When the packet descriptor corresponding to the packet is passed to the queue controller 128 and is received by the demultiplexer unit 220 for transfer to the egress port 112, the demultiplexer unit 220 determines the appropriate priority queue 208 based on the first queue priority indicator and the second queue priority indicator and whether the egress port 112 is coupled to an AVB device, as discussed above, according to an embodiment.

Figure 3:
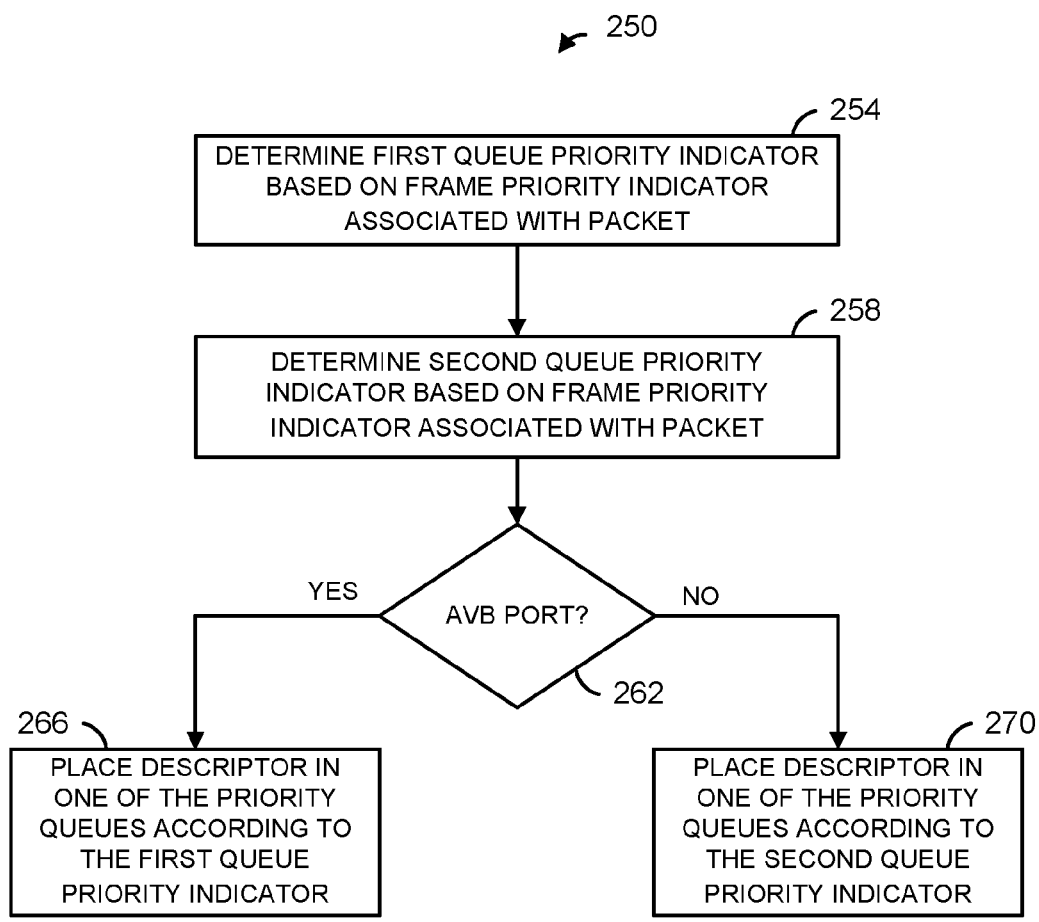
FIG. 3 is a flow diagram of an example method for placing a packet descriptor in an appropriate priority queue for egress, according to an embodiment.

FIG. 3 is a flow diagram of an example method 250 for placing a packet descriptor in an appropriate priority queue for egress, according to an embodiment. The method 250 is implemented by the enhanced AVB switch 108 (FIG. 1), in an embodiment. In other embodiments, the method 250 is implemented by another suitable switch device.

At block 254, a first queue priority indicator is determined based on a frame priority indicator associated with the packet, such as an indicator corresponding to an IEEE 802.1Q PCP field. At block 258, a second queue priority indicator is determined based on the frame priority indicator. At block 262, it is determined whether the port 112 via which the packet is to egress is coupled to an AVB device. Block 262 includes a suitable technique for determining if a port 112 is coupled to an AVB device.

If it is determined at block 262 that the port 112 via which the packet is to egress is coupled to an AVB device, the flow proceeds to block 266. At block 266, the descriptor is placed into an appropriate priority queue based on the first queue priority indicator. On the other hand, if it is determined at block 262 that the port 112 via which the packet is to egress is coupled to a non-AVB device, the flow proceeds to block 270. At block 270, the descriptor is placed into an appropriate priority queue based on the second queue priority indicator.

In some embodiments and scenarios, a received packet that is to be egressed via a plurality of ports 112 (e.g., a multicast packet or a broadcast packet), including AVB ports 112 and non-AVB ports, will be mapped to different priority queues 208 for different ports 112. As an illustrative example, a multicast packet is mapped to priority queue 208-1 for an AVB port 112, whereas the multicast packet is mapped to priority queue 208-3 for a non-AVB port 112.

In an embodiment, blocks 254 and 258 are implemented in the ingress processing unit 116 of the port 112 via which the packet ingressed. In an embodiment, blocks 262, 266, 270 are implemented in the egress queue unit 204 corresponding to each port 112 via which the packet is to egress. For example, in an embodiment, the demultiplexer unit 220 is configurable to use the first queue priority indicator to place the packet descriptor into the appropriate priority queue even when the egress port 112 is a non-AVB port. This can utilized to enable AVB traffic to exit the non-AVB port 112, which will be discussed in more detail below.

In an embodiment, a queue priority override field for the port 112 is set to a first value to indicate that the descriptor should placed into an appropriate priority queue based on the first queue priority indicator when the port is coupled to a non-AVB device, and the queue priority override field for the port 112 is set to a second value to indicate that the descriptor should placed into an appropriate priority queue based on the second queue priority indicator when the port is coupled to a non-AVB device. The queue priority override field for the port 112 is stored in a register or other suitable memory storage device, such as a random access memory (RAM), in an embodiment. The memory storage device is included in the port 112, in the queue controller, or another suitable location in the enhanced AVB switch, in an embodiment.

Figure 4:
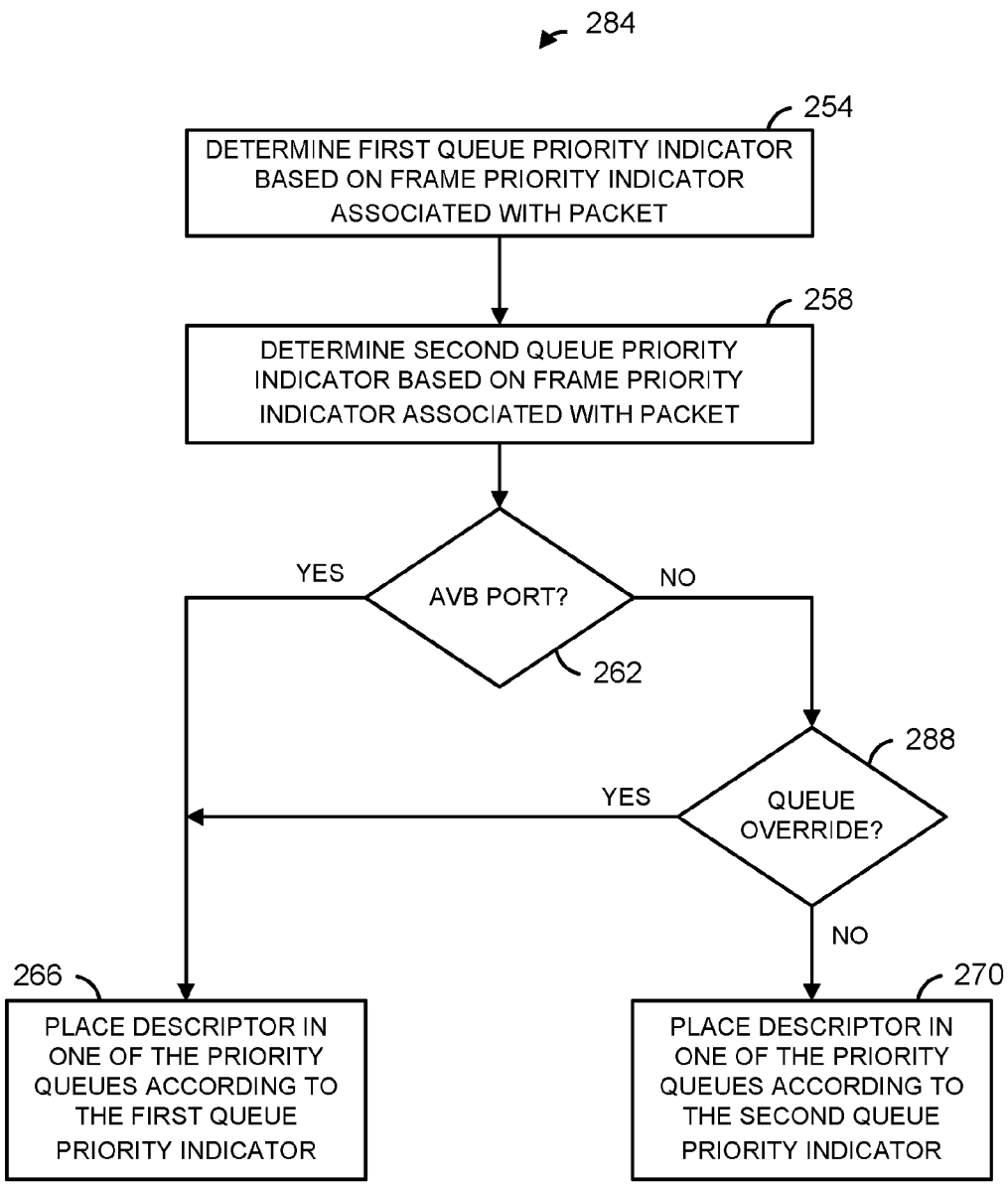
FIG. 4 is a flow diagram of another example method for placing a packet descriptor in an appropriate priority queue for egress, according to another embodiment.

FIG. 4 is a flow diagram of another example method 284 for placing a packet descriptor in an appropriate priority queue for egress, according to an embodiment. The method 284 is implemented by the enhanced AVB switch 108 (FIG. 1), in an embodiment. In other embodiments, the method 284 is implemented by another suitable switch device. The method 284 is similar to the method 250 of FIG. 250, and like-numbered blocks are not discussed for brevity.

If it is determined at block 262 that the port 112 via which the packet is to egress is coupled to a non-AVB device, the flow proceeds to block 288. At block 288, it is determined whether the queue priority override field for the port 112 is set to the first value which indicates that the descriptor should placed into an appropriate priority queue based on the first queue priority indicator. If it is determined that the queue priority override field is set to the first value, the flow proceeds to block 266 at which the descriptor is placed into an appropriate priority queue based on the first queue priority indicator.

On the other hand, if it is determined at block 288 that the queue priority override field for the port 112 is set to the second value which indicates that the descriptor should placed into an appropriate priority queue based on the second queue priority indicator, the flow proceeds to block 270. At block 270, the descriptor is placed into an appropriate priority queue based on the second queue priority indicator.

Figure 5:
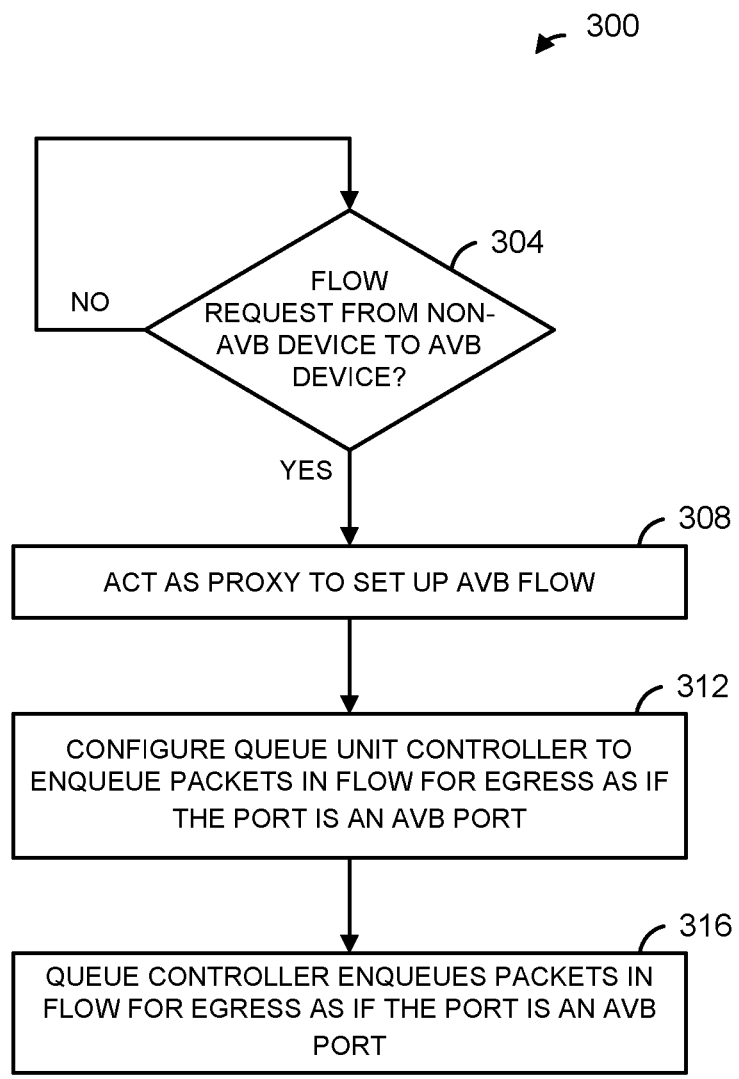
FIG. 5 is a flow diagram of an example method for delivering an AVB flow to a non-AVB device, according to an embodiment.

The method 284 of FIG. 4, or another suitable method, is utilized to enable AVB traffic to exit a non-AVB port 212, in an embodiment, which enables a non-AVB device to receive an AVB flow. FIG. 5 is a flow diagram of an example method 300 for delivering an AVB flow to a non-AVB device, according to an embodiment. The method 300 is implemented by the enhanced AVB switch 108 (FIG. 1), in an embodiment, and the method 300 is described with respect to FIGS. 1 and 2 for ease of explanation. In other embodiments, the method 300 is implemented by another suitable switch device.

At block 304, the enhanced AVB switch 108 detects a request from a non-AVB device 112 for a flow, where the request is directed to an AVB device. In an embodiment, the block 304 is implemented by the controller 120 and the forwarding engine 124. For example, in an embodiment, the forwarding engine 124 mirrors or forwards to the controller 120 packets that ingress on a non-AVB port 112 and egress or would otherwise egress on an AVB port 112, and the controller 120 analyzes the mirrored/forwarded packets to detect a request for a flow, e.g., a request for a video stream, a request for an audio stream, a message related to setting up a voice over IP (VoIP) session, etc.

If a request from a non-AVB device 112 for a flow, where the request is directed to an AVB device, is detected, the flow proceeds to block 308. At block 308, the enhanced AVB switch 108 acts as a proxy for the non-AVB device 104 to set up an AVB flow with the AVB device to which the request for the flow was sent. In an embodiment, the block 308 is implemented by the controller 120. For example, in an embodiment, the controller 120 exchanges messages with the AVB device 104 to set up the AVB flow on behalf of the non-AVB device 104.

At block 312, the enhanced AVB switch 108 configures the queue controller 128 so that the egress queue unit 204 corresponding to the port 112 to which the non-AVB device 104 is coupled enqueues packets in the flow for egress as if the port 112 is an AVB port. For example, in an embodiment, the controller 120 configures the queue controller 128 and/or the port 112 coupled to the non-AVB device to set the queue priority override field (discussed above with respect to FIG. 4) for the port 112 coupled to the non-AVB device to the first value. As discussed above, setting the queue priority override field to the first value indicates that descriptors forwarded to the port 112 coupled to the non-AVB device should be placed into an appropriate priority queue based on the first queue priority indicator. Also as discussed above, the first queue priority indicator indicates the particular priority queue 208 in which the packet descriptor should be placed when the egress port 112 is coupled to an AVB device.

At block 316, the queue controller 128 enqueues packets in the flow for egress as if the port 112 is an AVB port. For example, in an embodiment, the queue controller 128 implements the method 284 of FIG. 4. In other embodiments, the queue controller 128 implements another suitable method to enqueue packets in the flow for egress as if the port 112 is an AVB port.

The AVB Standards have reserved certain IEEE 802.1p Standard PCP field values for use in handling AVB packets. The PCP field is included in an IEEE 802.1Q tag in a header of a packet. For example, the PCP field value 3 is reserved for AVB high priority packets (as a default), and the PCP field value 2 is reserved for AVB low priority packets (as a default). According to the AVB Standards, non-AVB packets should not utilize the reserved PCP field values (e.g., values 2 and 3, as defaults) so that AVB-enabled network devices can distinguish AVB packets from non-AVB packets by simply examining the PCP field. As discussed above, a switch device can be configured so that a PCP field value other than 3 is reserved for AVB high priority packets, and a PCP field value other than 2 is reserved for AVB low priority packets.

Referring again to FIG. 1, in an embodiment, each port 112 includes the header modifier unit 150 as discussed above. In an embodiment, the header modifier unit 150 determines whether to modify a header of a packet on egress so that non-AVB packets do not utilize the PCP field values reserved by the AVB Standards when egressing from an AVB port 112. The header modifier unit 150 modifies the header of a packet on egress when appropriate.

Figure 6:
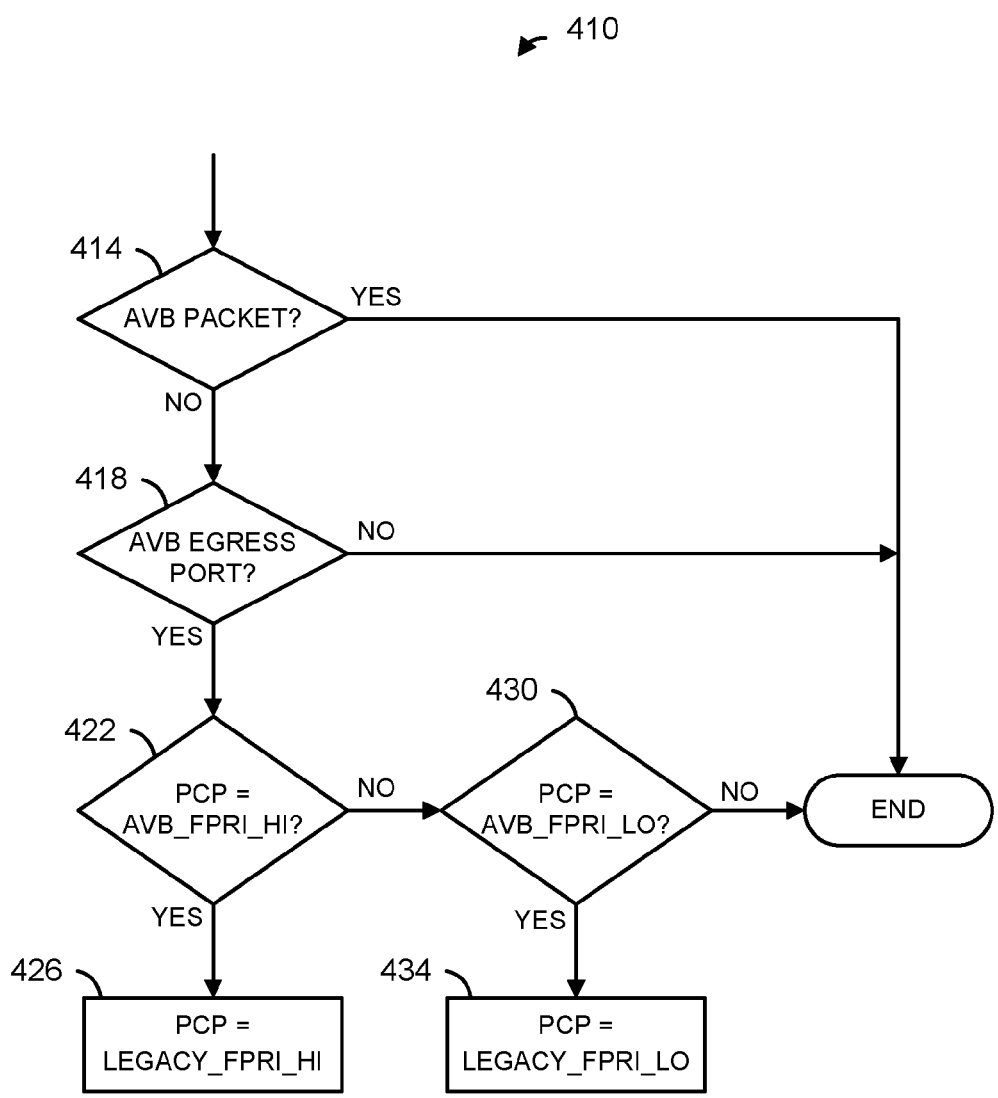
FIG. 6 is a flow diagram of an example method for determining whether to modify a header of a packet on egress, and modifying the header when appropriate on egress, according to an embodiment.

FIG. 6 is a flow diagram of an example method 410 for determining whether to modify a header of a packet on egress, and modifying the header when appropriate on egress so that non-AVB packets do not utilize the PCP field values reserved for AVB packets when egressing from an AVB port, according to an embodiment. In an embodiment, the method 410 is implemented by the header modifier unit 150 (FIG. 1). In other embodiments, the method 410 is implemented additionally or alternatively by other suitable components of the enhanced-AVB switch. The method 410 is described with reference to FIG. 1 for ease of explanation. In some embodiments, however, the method 410 is implemented by a suitable network device other than the switch 108 of FIG. 1.

At block 414, it is determined whether a packet to be egressed is an AVB packet. Determining whether a packet is an AVB packet is implemented using any of a variety of suitable techniques. For example, in an embodiment, an ingress processing unit 116 of a port 112 that receives the packet examines a PCP field of the packet to determine whether a value of the PCP field is one of the values reserved for AVB packets. If the ingress port 112 is an AVB port and the PCP field is one of the values reserved for AVB packets, the ingress processing unit 116 determines that the packet is an AVB packet. The ingress processing unit 116 then sets an AVB field associated with the packet to a value indicating the packet is an AVB packet. When the packet is handled by the egress processing unit of a port 112 that is to egress the packet, the egress processing unit 118 determines whether the packet is an AVB packet by examine the AVB field associated with the packet. In another embodiment, when the packet is handled by the egress processing unit 118, the egress processing unit 118 determines whether the packet is an AVB packet by determining whether the packet was received via an AVB port 112 and by examining the PCP field of the packet. In an embodiment, the AVB field is included in the packet descriptor associated with the packet.

In another embodiment, the AVB field is stored in the shared memory 132 at a location associated with the packet. In another embodiment, the AVB field is stored in a suitable memory storage device and associated with the packet and accessible by the egress processing unit 118.

If it is determined that the packet is an AVB packet, the method 410 ends. On the other hand, if it is determined that the packet is not an AVB packet, the flow proceeds to block 418. At block 418, it is determined whether the egress port 112 is an AVB port (e.g., is coupled to an AVB-enabled device). Determining whether the egress port 112 is an AVB port is implemented using any of a variety of suitable techniques. For example, in an embodiment, the egress port 112 exchanges messages with the device 104 coupled to the egress port 112 and follows a protocol specified by the AVB Standards to determine whether the device 104 is an AVB enabled device.

If it is determined that the port is not an AVB port, the method 410 ends. In other words, when a packet is not an AVB packet and when the packet egresses via a non-AVB port, the PCP field of the packet is not modified by the enhanced AVB switch 108.

On the other hand, if it is determined that the egress port 112 is an AVB port, the flow proceeds to block 422. At block 422, it is determined whether a value of the PCP field of the packet is set to a first value reserved for AVB packets (e.g., a reserved value corresponding to AVB high priority, e.g., 3). In an embodiment, block 422 includes examining a variable FPRI that indicates the value of the PCP field of the packet. In an embodiment, the variable FPRI is included in the packet descriptor corresponding to the packet and provided to the egress port 112. In another embodiment, the variable FPRI is stored in the shared memory 132 and associated with the packet. In another embodiment, block 422 includes examining the header of the packet stored in the shared memory 132.

If it is determined that the value of the PCP field of the packet is set to the first value reserved for AVB packets, the flow proceeds to block 426. At block 426, the PCP field of the packet is modified to a first non-reserved value (e.g., a non-reserved value corresponding to high priority (LEGACY_FPRI_HI), e.g., not 2 or 3). In an embodiment, block 426 includes setting the value of FPRI to the first non-reserved value, and setting the PCP field of the packet stored in the shared memory 132 to the value of FPRI. In another embodiment, block 426 omits setting the value of a variable such as FPRI and merely includes setting the value of the PCP field of the packet stored in the shared memory 132 to the first non-reserved value.

On the other hand, if it is determined at block 422 that the value of the PCP field of the packet is not set to the first value reserved for AVB packets, the flow proceeds to block 430. At block 430, it is determined whether a value of the PCP field of the packet is set to a second value reserved for AVB packets (e.g., a reserved value corresponding to AVB low priority, e.g., 2). If it is determined that the value of the PCP field of the packet is not set to the second value reserved for AVB packets, the flow ends.

On the other hand, if it is it is determined at block 430 that the value of the PCP field of the packet is set to the second value reserved for AVB packets, the flow proceeds to block 434. At block 434, the PCP field of the packet is modified to a second non-reserved value (e.g., a non-reserved value corresponding to low priority (LEGACY_FPRI_LO), e.g., not 2 or 3). In an embodiment, block 434 includes setting the value of FPRI to the second non-reserved value, and setting the PCP field of the packet stored in the shared memory 132 to the value of FPRI. In another embodiment, block 434 omits setting the value of a variable such as FPRI and merely includes setting the value of the PCP field of the packet stored in the shared memory 132 to the second non-reserved value.

Referring again to FIG. 1, in an embodiment, the enhanced AVB switch 108 is configured to enqueue non-AVB packets as if they are AVB packets. In an embodiment, the forwarding database 126 includes information that indicates, for a packet with a given combination of header information (e.g., a given combination of one or more of a destination address (DA), a source address (SA), a VLAN tag, etc.), whether packets corresponding to the given combination are to be enqueued as if AVB packets.

Figure 7:
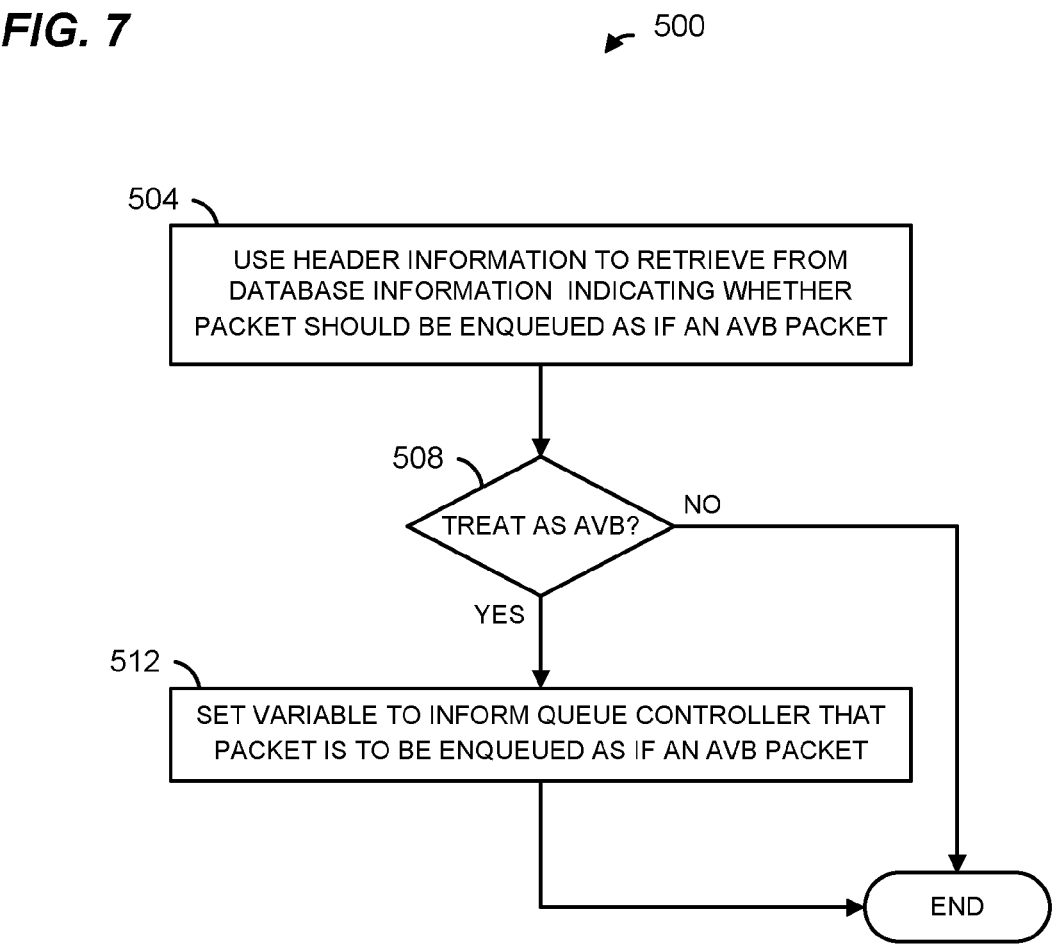
FIG. 7 is a flow diagram of an example method for processing non-AVB packets in a network device to enqueue the non-AVB packets as if AVB packets, according to an embodiment.

FIG. 7 is a flow diagram of an example method 500 for processing non-AVB packets in a network device to enqueue the non-AVB packets as if AVB packets, according to an embodiment. In an embodiment, the method 500 is implemented by the enhanced AVB switch 108 (FIG. 1), and the method 500 is described with reference to FIG. 1 for ease of explanation. In an embodiment, the method 500 is implemented at a non-AVB port 112. In some embodiments, however, the method 500 is implemented by a suitable network device other than the enhanced AVB switch 108 of FIG. 1.

At block 504, header information for the packet is utilized to retrieve from a database information indicating whether the packet should be enqueued as if an AVB packet. In an embodiment, the ingress processing unit 116 interfaces with the forwarding engine 124 to retrieve information from the forwarding database 126 that indicates whether a particular packet should be enqueued as if an AVB packet. The forwarding database 126 associates particular DAs with indications whether a packet having the DA in the header should be enqueued as if an AVB packet, in an embodiment. In an embodiment, the forwarding database 126 associates particular DA/SA pairs with indications whether a packet having the DA/SA pair in the header should be enqueued as if an AVB packet, in an embodiment. In other embodiments, the forwarding database 126 associates other combinations of information in a packet header to an indication of whether a packet having the combination of header information should be enqueued as if an AVB packet. The indication of whether a packet having the combination of header information should be enqueued as if an AVB packet is a field of a database entry associated with the combination of header information, in an embodiment.

At block 508, it is determined whether the information retrieved at block 504 indicates that the packet should be enqueued as if an AVB packet. If the packet is not to be enqueued as if an AVB packet, the flow ends.

On the other hand, if it is determined at block 508 that the packet is to be enqueued as if an AVB packet, the flow proceeds to block 512. At block 512, a variable is set to indicate to the queue controller 128 that the packet is to be enqueued as if an AVB packet. In an embodiment, the variable indicates to the egress queue unit 204 associated with an AVB port 112 via which the packet is to egress that the packet is to be enqueued as if an AVB packet. The variable is stored the packet descriptor associated with the packet, in an embodiment. In another embodiment, the variable is stored in the shared memory 132 at a location associated with the packet. In another embodiment, the variable is stored in a suitable memory storage device and associated with the packet and accessible by the queue controller 128. In an embodiment, the variable is the AVB field discussed above with respect to FIG. 6. In another embodiment, the variable is different than the AVB field discussed above with respect to FIG. 6. In an embodiment, the variable is utilized to modify the AVB field.

Referring now to FIGS. 6 and 7, in an embodiment, if the variable set at block 512 of FIG. 7 is different than the AVB field discussed with respect to FIG. 6 or the AVB field is not modified in response to block 512, block 414 of FIG. 6 includes examining the variable set at block 512 to determine if the packet is an AVB packet, in an embodiment.

FIG. 8 is a flow diagram of another example method 550 for processing non-AVB packets in a network device to enqueue the non-AVB packets as if AVB packets, according to an embodiment. In an embodiment, the method 550 is implemented by the enhanced AVB switch 108 (FIG. 1), and the method 550 is described with reference to FIG. 1 for ease of explanation. In an embodiment, the method 550 is implemented at least partially by a non-AVB port 112. In an embodiment, the method 550 is implemented by a non-AVB port 112 (ingress) and an AVB port 112 (egress). In some embodiments, however, the method 550 is implemented by a suitable network device other than the enhanced AVB switch 108 of FIG. 1.

At block 554, header information for the packet is utilized to retrieve from a database information indicating whether the packet should be enqueued as if an AVB packet. In an embodiment, the ingress processing unit 116 interfaces with the forwarding engine 124 to retrieve information from the forwarding database 126 that indicates whether a particular packet should be enqueued as if an AVB packet. The forwarding database 126 associates particular DAs with indications whether a packet having the DA in the header should be enqueued as if an AVB packet, in an embodiment. In an embodiment, the forwarding database 126 associates particular DA/SA pairs with indications whether a packet having the DA/SA pair in the header should be enqueued as if an AVB packet, in an embodiment. In other embodiments, the forwarding database 126 associates other combinations of information in a packet header to an indication of whether a packet having the combination of header information should be enqueued as if an AVB packet. The indication of whether a packet having the combination of header information should be enqueued as if an AVB packet is a field of a database entry associated with the combination of header information, in an embodiment.

Additionally, header information for the packet is utilized to retrieve from the database information indicating whether the priority indicator information in the header (e.g., the PCP field) can be modified. In an embodiment, the header information for the packet is also utilized to retrieve from the database an override value for the priority indicator information in the header.

At block 558, it is determined whether the information retrieved at block 554 indicates that the packet should be enqueued as if an AVB packet. If the packet is not to be enqueued as if an AVB packet, the flow ends.

On the other hand, if it is determined at block 558 that the packet is to be enqueued as if an AVB packet, the flow proceeds to block 562. At block 562, it is determined whether the information retrieved at block 554 indicates that the packet priority indicator information in the header can be modified. If the priority indicator information in the header cannot be modified, the flow ends.

On the other hand, if it is determined at block 562 that the packet priority indicator information in the header can be modified, the flow proceeds to block 562. At block 566, a variable is set to indicate to the queue controller 128 that the packet is to be enqueued as if an AVB packet similar to the block 512 of FIG. 7.

At block 570, the packet priority indicator information in the header is modified using the override value retrieved at block 554. In an embodiment, the ingress processing unit 116 of the ingress port implements block 570. In an embodiment, the ingress processing unit 116 of the ingress port and the egress processing unit of the egress port implement block 570. For example, in an embodiment, the ingress processing unit 116 of the ingress port provides information to the egress processing unit 118 of the egress port informing the egress port to modify the header (using the header modifier unit 150) and specifying or indicating the override value. In an embodiment, the information provided by the ingress processing unit 116 to the egress processing unit is provided in the packet descriptor or using another suitable mechanism, such as via the shared memory 132.

Referring to FIGS. 3 and 8, if blocks 254 and 258 are performed prior to performing block 570, blocks 254 and 258, or similar blocks, are re-performed in response to performing block 570.

Figure 9:
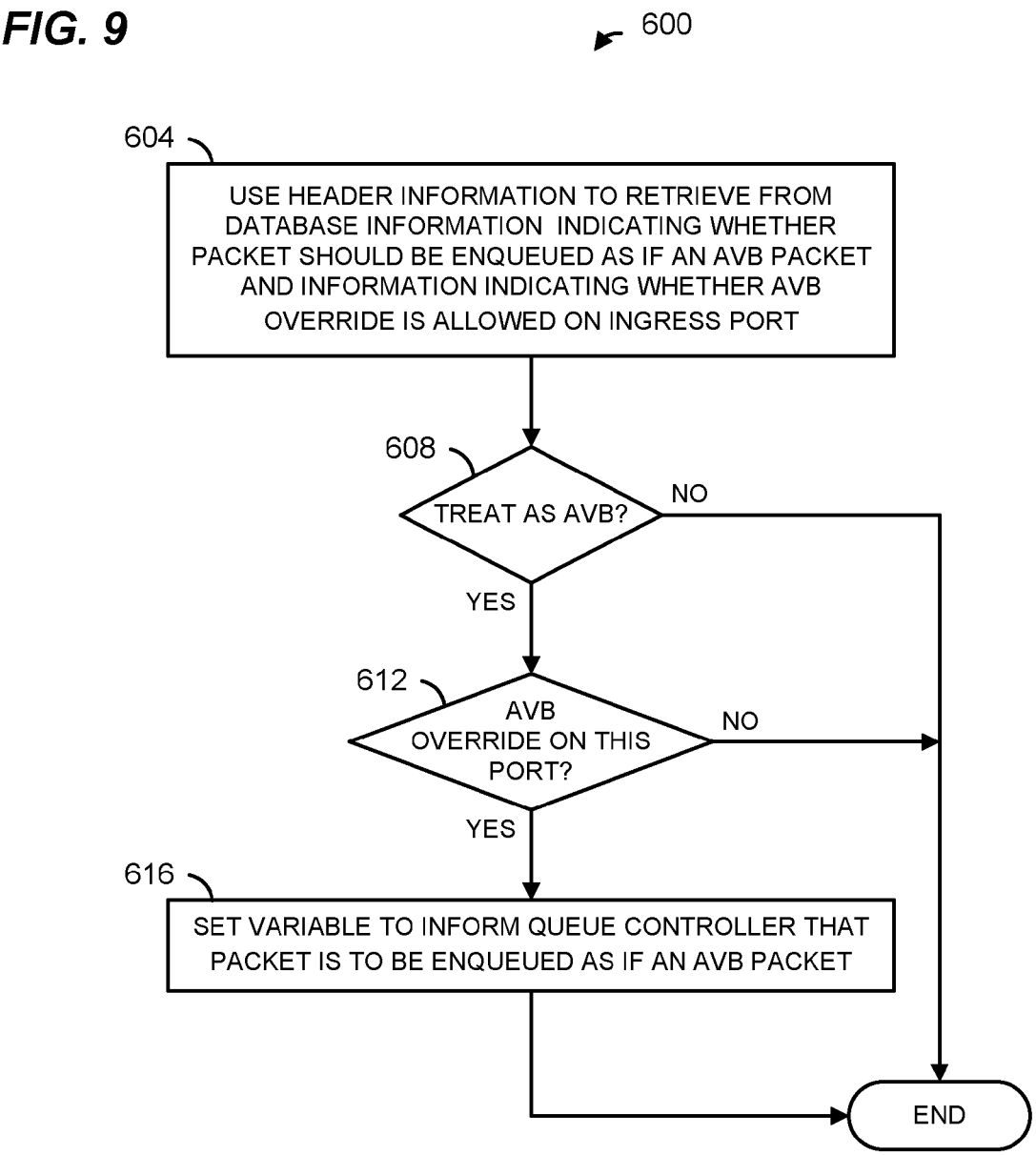
FIG. 9 is a flow diagram of another example method for processing non-AVB packets in a network device to enqueue the non-AVB packets as if AVB packets, according to another embodiment.

In an embodiment, the method of FIG. 7 is modified to permit enqueuing a non-AVB packet as an AVB packet (AVB override) only if the ingress port is enabled for AVB override. FIG. 9 is a flow diagram of another example method 600 for processing non-AVB packets in a network device to enqueue the non-AVB packets as if AVB packets, according to an embodiment. In an embodiment, the method 600 is implemented by the enhanced AVB switch 108 (FIG. 1), and the method 600 is described with reference to FIG. 1 for ease of explanation. In an embodiment, the method 600 is implemented at least partially by a non-AVB port 112. In an embodiment, the method 600 is implemented by a non-AVB port 112 (ingress) and an AVB port 112 (egress). In some embodiments, however, the method 600 is implemented by a suitable network device other than the enhanced AVB switch 108 of FIG. 1.

At block 604, header information for the packet is utilized to retrieve from a database information indicating whether the packet should be enqueued as if an AVB packet. In an embodiment, the ingress processing unit 116 interfaces with the forwarding engine 124 to retrieve information from the forwarding database 126 that indicates whether a particular packet should be enqueued as if an AVB packet. The forwarding database 126 associates particular DAs with indications whether a packet having the DA in the header should be enqueued as if an AVB packet, in an embodiment. In an embodiment, the forwarding database 126 associates particular DA/SA pairs with indications whether a packet having the DA/SA pair in the header should be enqueued as if an AVB packet, in an embodiment. In other embodiments, the forwarding database 126 associates other combinations of information in a packet header to an indication of whether a packet having the combination of header information should be enqueued as if an AVB packet. The indication of whether a packet having the combination of header information should be enqueued as if an AVB packet is a field of a database entry associated with the combination of header information, in an embodiment.

Additionally, information for the packet is utilized to retrieve from the database information indicating which ports 112 are enabled to permit designating a non-AVB packet an AVB packet (AVB override). The forwarding database 126 associates particular DAs with indications of the ports 112 that are enabled to perform an AVB override with respect to those DAs, in an embodiment.

At block 608, it is determined whether the information retrieved at block 604 indicates that the packet should be enqueued as if an AVB packet. If the packet is not to be enqueued as if an AVB packet, the flow ends.

On the other hand, if it is determined at block 608 that the packet is to be enqueued as if an AVB packet, the flow proceeds to block 612. At block 612, it is determined whether the information retrieved at block 604 indicates that the ingress port 112 is permitted to perform an AVB override. For example, the information retrieved at block 604 that indicates the port(s) 112 that are enabled to perform an AVB override with respect to the DA of the packet is analyzed to determine if AVB override is permitted at the port via which the packet ingressed. If the port 112 is not permitted to perform an AVB override, the flow ends.

On the other hand, if it is determined at block 612 that the packet priority indicator information in the header can be modified, the flow proceeds to block 616. At block 616, a variable is set to indicate to the queue controller 128 that the packet is to be enqueued as if an AVB packet similar to the block 512 of FIG. 7.

In another embodiment, configuration information for a port indicates whether packets egressing from the port should be treated as AVB packets even when the port is not coupled to an AVB device. In an embodiment, this configuration information is utilized to determine whether a packet should be enqueued as if an AVB packet when egressing a non-AVB port.

In an embodiment, the method of FIG. 8 is modified to permit enqueuing a non-AVB packet as an AVB packet (AVB override) only if the ingress port is enabled for AVB override similar to the method 600 of FIG. 9.

In other embodiments, information regarding whether an ingress port is permitted to perform an AVB override is stored in a register or other suitable storage device associated with the port.

Figure 10:
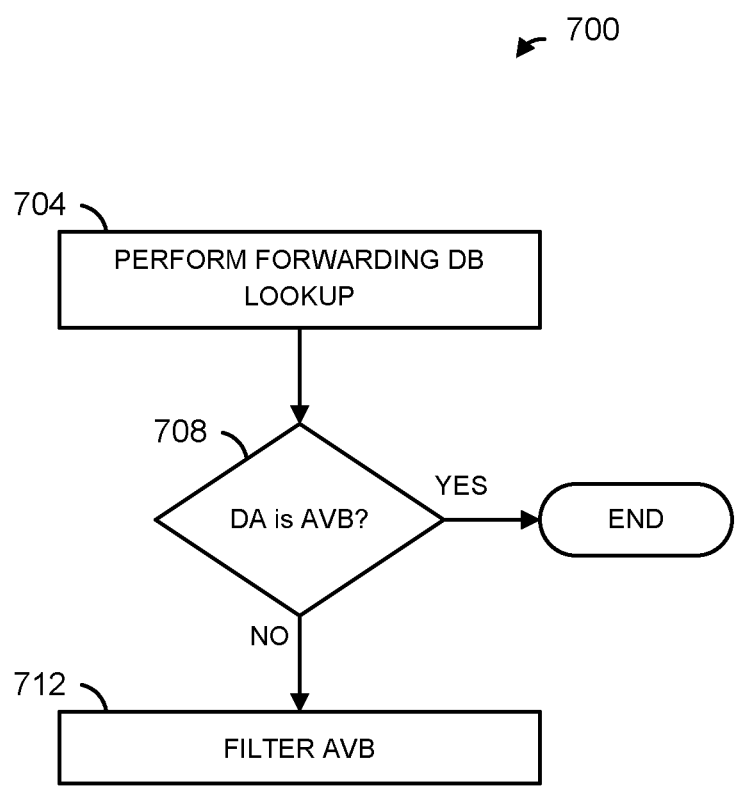
FIG. 10 is a flow diagram of an example method for processing a packet in a network device, according to another embodiment.

FIG. 10 is a flow diagram of an example method 700 for processing packets in a network device, according to an embodiment. In an embodiment, the method 700 is implemented by the enhanced AVB switch 108 (FIG. 1), and the method 700 is described with reference to FIG. 1 for ease of explanation. In an embodiment, the method 700 is implemented at least partially by a port 112. In some embodiments, however, the method 700 is implemented by a suitable network device other than the enhanced AVB switch 108 of FIG. 1.

In the method 700, it is assumed that the packet being processed has a frame priority indicator corresponding to an AVB value. For example, it is assumed that the packet being processed has an IEEE 802.1Q PCP field value of 2 or 3, in an embodiment.

At block 704, a forwarding database lookup is performed. In an embodiment, the forwarding engine 124 performs a lookup in the database 126 using header information of the packet.

In an embodiment, the forwarding database 126 includes information that indicates, for packets with a given combination of header information (e.g., a given combination of one or more of a destination address (DA), a source address (SA), a VLAN tag, etc.), whether packets corresponding to the given combination are permitted to be treated as AVB packets. In an embodiment, the forwarding database 126 includes information that indicates, for packets with a particular DA, whether packets having the DA are permitted to be treated as AVB packets.

In other embodiments, the database is not a forwarding database. For example, the database stores information that indicates which DAs (or which combinations of header information) are associated with AVB packets.

At block 708, it is determined whether the packet is to be treated as an AVB packet based on information obtained at block 704. If it is determined that the packet is to be treated as an AVB packet, the flow ends.

On the other hand, if it is determined at block 708 that the packet is not to be treated as an AVB packet, the flow proceeds to block 712, at which the packet is filtered. In an embodiment, block 712 includes preventing the packet from egressing via any AVB ports, but allowing the packet to egress via non-AVB ports, when appropriate. For example, if the packet is a multicast packet or is to be flooded, the packet is only permitted to egress non-AVB ports. In another embodiment, block 712 includes allowing the packet to egress via one or more AVB ports after modifying a header of the packet to change the frame priority indicator to a non-AVB value, and allowing the packet to egress via non-AVB ports. For example, the IEEE 802.1Q PCP field value of the packet is changed to a value other than 2 or 3, in an embodiment.

In another embodiment, block 712 includes preventing the packet from egressing via any ports, including both AVB ports and non-AVB ports.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method implemented by a network switch device that supports an audio video bridging (AVB) communication protocol and a non-AVB communication protocol, the method comprising:

receiving a packet via an ingress port of a plurality of ports of the network switch device, each port of the plurality of ports having i) a respective plurality of packet descriptor queues, and ii) a respective demultiplexer coupled with each of the plurality of packet descriptor queues for the port, wherein, when received, the packet includes header information, the header information including a priority field set to a reserved value that is reserved for packets that are to be handled according to the AVB communication protocol by communication devices in a communication network that comprises the network switch device;

performing, at an ingress processor of the network switch device, a database lookup in a database using the header information of the packet to retrieve AVB permission information that indicates whether the packet should be handled by the network switch device according to the AVB communication protocol at one or more egress ports of the plurality of ports;

responsive to determining, at the network switch device, that the packet includes the priority field set to the reserved value, determining, at the ingress processor and using the AVB permission information retrieved from the database, whether the packet should be handled by the network switch device according to the AVB communication protocol;

when it is determined, using the AVB permission information retrieved from the database, that the packet should be handled by the network switch device according to the AVB communication protocol, transmitting the packet according to the AVB communication protocol via the one or more egress ports of the network switch device, the one or more egress ports determined by the ingress processor using the header information of the packet; and when it is determined, using the AVB permission information retrieved from the database, that the packet should not be handled by the network switch device according to the AVB communication protocol, filtering, at the network switch device, the packet according to the AVB permission information, wherein filtering the packet comprises
setting the priority field in the packet to a non-AVB value,
enqueuing the packet in the plurality of packet descriptor queues by the demultiplexer of a first egress port of the one or more egress ports based on the priority field set to the non-AVB value, wherein the first egress port is configured to operate according to the AVB communication protocol with the priority field set to the non-AVB value, and
transmitting the packet from the first egress port.

2. The method of claim 1, wherein:
the database is a forwarding database;
performing the database lookup comprises performing the database lookup in the forwarding database using the header information to retrieve i) the AVB permission information and ii) forwarding information; and the method further includes determining, using the retrieved forwarding information, the one or more egress ports via which to transmit the packet, the one or more egress ports including the first egress port.

3. The method of claim 1, further comprising:
determining, at the network device and using the AVB permission information retrieved from the database, whether the packet should be handled by the one or more egress ports according to the AVB communication protocol, the one or more egress ports including the first egress port; and
when it is determined, using the AVB permission information retrieved from the database, that the packet should be handled by the one or more egress ports according to the AVB communication protocol, transmitting the packet according to the AVB communication protocol via the one or more egress ports;
wherein filtering the packet comprises, at each of the one or more egress ports, one of i) preventing the packet from ever being transmitted from the egress port, or ii) setting the priority field in the packet to the non-AVB value, enqueuing the packet based on the priority field set to the non-AVB value, and transmitting the packet from the egress port with the priority field set to the non-AVB value.

4. The method of claim 3, wherein:
determining whether the packet should be handled according to the AVB communication protocol comprises determining whether the packet is of a multicast AVB type; and
when it is determined that the packet is of the multicast AVB type, filtering the packet comprises allowing the packet to egress only from egress ports of the one or more egress ports that are not configured to operate according to the AVB communication protocol so that the packet is not ever transmitted by any egress ports that are configured to operate according to the AVB communication protocol.

5. The method of claim 3, wherein:
determining whether the packet should be handled by the one or more egress ports according to the AVB communication protocol comprises determining whether the packet is to be flooded by the network device; and
when it is determined that the packet is to be flooded by the network device, filtering the packet comprises allowing the packet to egress only from egress ports of the one or more egress ports that are not configured to operate according to the AVB communication protocol so that the packet is not ever transmitted by any egress ports that are configured to operate according to the AVB communication protocol.

6. The method of claim 1, wherein:
the priority field is an Institute for Electrical and Electronics Engineers (IEEE) 802.1p priority code point (PCP) field of an IEEE 802.1Q Standard VLAN tag;
the reserved value is 2 or 3; and
setting the priority field in the packet to the non-AVB value comprises modifying the PCP field to a value different from 2 and 3.

7. A network switch device, comprising:
a plurality of ports, each port of the plurality of ports having i) a respective plurality of packet descriptor queues, and ii) a respective demultiplexer coupled with each of the plurality of packet descriptor queues for the port;
one or more integrated circuit devices configured to utilize header information in packets received via the plurality of ports to determine appropriate ports via which the packets are to be transmitted by the network device,
perform, at one or more ingress processors, database lookups in a database using header information in first packets in the plurality of packets to retrieve respective audio video bridging (AVB) permission information for the first packets that indicate, for each first packet, whether the first packet should be handled by the network switch device according to an AVB communication protocol,
for each first packet determined to include a priority field set to a reserved value that is reserved for packets that are to be handled according to the AVB communication protocol by communication devices in a communication network that comprises the network switch device, and responsive to determining that the first packet includes the priority field set to the reserved value,
determine, at the one or more ingress processors using the AVB permission information retrieved from the database, whether the first packet should be handled by the network switch device according to the AVB communication protocol at one or more egress ports of the plurality of ports,
when it is determined, using the AVB permission information retrieved from the database, that the first packet should be handled by the network switch device according to the AVB communication protocol, transmit the particular first packet according to the AVB communication protocol via the one or more egress ports determined by the one or more integrated circuit devices using header information of the first packet, and
when it is determined, using the AVB permission information retrieved from the database, that the first packet should not be handled by the network switch device according to the AVB communication protocol, filter the first packet according to the AVB permission information,
wherein filtering the packet comprises setting the priority field in the packet to a non-AVB value, enqueuing the packet in the plurality of packet descriptor queues by the demultiplexer of a first egress port of the one or more egress ports based on the priority field set to the non-AVB value, and transmitting the packet from the first egress port, wherein the first egress port is configured to operate according to the AVB communication protocol with the priority field set to the non-AVB value.

8. The network switch device of claim of 7, wherein:
the database is the forwarding database;
the network switch device further comprises the forwarding database;
the one or more integrated circuit devices are configured to
perform the database lookup in the forwarding database using the header information to retrieve i) the AVB permission information and ii) forwarding information, and
determine, using the retrieved forwarding information, the one or more egress ports via which the packets are to be transmitted by the network device.

9. The network switch device of claim of 7, wherein the one or more integrated circuit devices are configured to, for each first packet determined to include the priority field set to the reserved value and responsive to determining that the first packet includes the priority field set to the reserved value:
  determine, using the AVB permission information retrieved from the database, whether the first packet should be handled by the one or more egress ports according to the AVB communication protocol, and
  when it is determined, using the AVB permission information retrieved from the database, that the first packet should be handled by the set of one or more ports according to the AVB communication protocol, transmit the packet according to the AVB communication protocol via the set of one or more ports,
  wherein filtering the packet comprises, at each port of the set of one or more ports, one of i) preventing the packet from ever being transmitted from the port, or ii) setting the priority field in the packet to the non-AVB value, enqueuing the packet based on the priority field set to the non-AVB value, and transmitting the packet from the port with the priority field set to the non-AVB value.

10. The network switch device of claim of 9, wherein the one or more integrated circuit devices are configured to, for each first packet determined to include the priority field set to the reserved value and responsive to determining that the first packet includes the priority field set to the reserved value:
  determine whether the first packet is of a multicast AVB type, and
  when it is determined that the first packet is of the multicast AVB type, filtering the first packet comprises allowing the packet to egress only from egress ports of the one or more egress ports that are not configured to operate according to the AVB communication protocol so that the first packet is not ever transmitted by any ports that are configured to operate according to the AVB communication protocol.

11. The network switch device of claim of 9, wherein the one or more integrated circuit devices are configured to, for each first packet determined to include the priority field set to the reserved value and responsive to determining that the first packet includes the priority field set to the reserved value:
  determine whether the first packet is to be flooded by the network device, and
  when it is determined that the first packet is to be flooded by the network device, filtering the packet comprises allowing the first packet to egress only from egress ports of the one or more egress ports that are not configured to operate according to the AVB communication protocol so that the first packet is not ever transmitted by any ports that are configured to operate according to the AVB communication protocol.

12. The network switch device of claim of 7, wherein:
  the priority field is an Institute for Electrical and Electronics Engineers (IEEE) 802.1p priority code point (PCP) field of an IEEE 802.1Q Standard VLAN tag;
  the reserved value is 2 or 3; and
  the one or more integrated circuit devices are configured to set the priority field in the first packet to the non-AVB value at least by modifying the PCP field to a value different from 2 and 3.

* * * * *